(12) United States Patent
Qin et al.

(10) Patent No.: US 12,242,257 B2
(45) Date of Patent: *Mar. 4, 2025

(54) GENERATION OF MEDIA STATION PREVIEWS USING A SECONDARY TUNER

(71) Applicant: GRACENOTE, INC., Emeryville, CA (US)

(72) Inventors: John M. Qin, San Francisco, CA (US); Suresh Jeyachandran, Alameda, CA (US); Damon P. Fasching, San Francisco, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,869

(22) Filed: Apr. 17, 2023

(65) Prior Publication Data

US 2023/0251642 A1    Aug. 10, 2023

Related U.S. Application Data

(63) Continuation of application No. 17/737,732, filed on May 5, 2022, now Pat. No. 11,644,824, which is a
(Continued)

(51) Int. Cl.
| | |
|---|---|
| *G05B 19/42* | (2006.01) |
| *G06F 3/0481* | (2022.01) |
| *H04N 5/50* | (2006.01) |

(52) U.S. Cl.
CPC ........... *G05B 19/42* (2013.01); *G06F 3/0481* (2013.01); *H04N 5/50* (2013.01)

(58) Field of Classification Search
CPC ........ G05B 19/42; G06F 3/0481; H04N 5/50; H04N 21/4722; H04N 21/84;
(Continued)

(56) References Cited

U.S. PATENT DOCUMENTS 5,119,503 A    6/1992  Mankovitz
5,900,868 A *  5/1999  Duhault ............. H04N 21/4345
                                                          348/565
(Continued)

OTHER PUBLICATIONS

International Search Report received for PCT Patent Application No. PCT/US2019/068932, mailed on Apr. 27, 2020, 5 pages.
(Continued)

*Primary Examiner* — Fernando Alcon
(74) *Attorney, Agent, or Firm* — McDonnell Boehnen Hulbert & Berghoff LLP

(57) ABSTRACT

In one aspect, an example method includes (i) while a media playback device of a vehicle is playing back content received on a first channel, generating, by the media playback device, a query fingerprint using second content received on a second channel; (ii) sending, by the media playback device, the query fingerprint to a server that maintains a reference database containing a plurality of reference fingerprints; (iii) receiving, by the media playback device from the server, identifying information corresponding to a reference fingerprint of the plurality of reference fingerprints that matches the query fingerprint; and (iv) while the media playback device is playing back the first content received on the first channel, providing, by the media playback device for display, at least a portion of the identifying information.

20 Claims, 5 Drawing Sheets

Related U.S. Application Data continuation of application No. 16/729,947, filed on Dec. 30, 2019, now Pat. No. 11,360,466.

(60) Provisional application No. 62/788,604, filed on Jan. 4, 2019.

(58) Field of Classification Search
CPC ........... H04N 21/6547; H04N 21/6581; H04N 21/44209; H04N 21/482; H04N 21/4394; H04N 21/41422; H04N 21/4263; H04H 60/74; H04H 2201/30; H04H 60/44; H04H 60/37; H04H 2201/90

See application file for complete search history.

(56) References Cited

U.S. PATENT DOCUMENTS

| | | | |
|---|---|---|---|
| 6,147,714 A | 11/2000 | Terasawa et al. | |
| 6,295,646 B1 | 9/2001 | Goldschmidt Iki et al. | |
| 6,407,673 B1 | 6/2002 | Lane | |
| 6,804,824 B1 | 10/2004 | Potrebic et al. | |
| 9,485,532 B2 | 11/2016 | Farrand et al. | |
| 10,075,771 B1 | 9/2018 | Jeon et al. | |
| 11,032,200 B2 | 6/2021 | Kwak et al. | |
| 2003/0167174 A1* | 9/2003 | Dagtas | H03J 1/0083 704/275 |
| 2005/0044255 A1* | 2/2005 | Yokoyama | H04N 21/6175 348/E7.071 |
| 2005/0210526 A1* | 9/2005 | Levy | H04N 21/235 348/E7.071 |
| 2006/0215220 A1* | 9/2006 | Yamahara | G06F 16/68 358/1.15 |
| 2006/0253875 A1* | 11/2006 | Choi | H04N 5/445 725/38 |
| 2007/0192820 A1* | 8/2007 | Watanabe | H04N 21/4331 725/135 |
| 2008/0022317 A1 | 1/2008 | James et al. | |
| 2009/0258677 A1 | 10/2009 | Ellis et al. | |
| 2011/0141363 A1 | 6/2011 | Wullert, II | |
| 2011/0213681 A1 | 9/2011 | Shahid | |
| 2011/0247042 A1 | 10/2011 | Mallinson | |
| 2012/0183276 A1 | 7/2012 | Quan et al. | |
| 2013/0188095 A1 | 7/2013 | Hartson et al. | |
| 2014/0007152 A1 | 1/2014 | Pora et al. | |
| 2014/0176798 A1 | 6/2014 | Tanaka et al. | |
| 2015/0289011 A1 | 10/2015 | Park et al. | |
| 2016/0066032 A1 | 3/2016 | Grant et al. | |
| 2016/0134828 A1* | 5/2016 | Kim | H04N 21/4312 348/564 |
| 2016/0316262 A1 | 10/2016 | Chen | |
| 2017/0085941 A1 | 3/2017 | Gupta et al. | |
| 2017/0251251 A1 | 8/2017 | Seo et al. | |
| 2018/0063585 A1 | 3/2018 | Park | |
| 2018/0121159 A1 | 5/2018 | Thompson et al. | |
| 2018/0302670 A1 | 10/2018 | Lee et al. | |
| 2019/0238244 A1 | 8/2019 | Thramann et al. | |
| 2020/0029115 A1 | 1/2020 | Dunker et al. | |
| 2020/0137430 A1 | 4/2020 | Kwak et al. | |
| 2020/0218247 A1 | 7/2020 | Qin et al. | |

OTHER PUBLICATIONS

Written Opinion received for PCT Patent Application No. PCT/US2019/068932, mailed on Apr. 27, 2020, 8 pages.

\* cited by examiner

GENERATION OF MEDIA STATION PREVIEWS USING A SECONDARY TUNER

CROSS-REFERENCE TO RELATED APPLICATIONS

This disclosure is a continuation of U.S. patent application Ser. No. 17/737,732, filed May 5, 2022, which is a continuation of, and claims priority to, U.S. patent application Ser. No. 16/729,947 filed on Dec. 30, 2019 which claims priority to U.S. Provisional Patent App. No. 62/788,604, filed on Jan. 4, 2019, each of which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

Some media playback devices can display identifying information for content being played back on a channel while the content is being played back. For instance, while a radio is playing a song, a user interface of the radio can display textual information identifying a title, artist, and album of the song.

A communications protocol referred to as Radio Data System (RDS) allows broadcasters to send identifying information to radios through analog radio waves. Some radio stations transmit audio and other information using digital technology. Transmitting audio and other information over a digital signal allows a radio station to transmit additional types of identifying information, such as album images and artist images. A radio that is capable of receiving digital signals can display a received image that is associated with a song while the radio plays the song.

SUMMARY

In one aspect, an example method is disclosed. The method includes (i) while a media playback device is playing back first content received on a first channel, generating, by the media playback device, a query fingerprint using second content received on a second channel; (ii) sending, by the media playback device, the query fingerprint to a server that maintains a reference database containing a plurality of reference fingerprints; (iii) receiving, by the media playback device from the server, identifying information corresponding to a reference fingerprint of the plurality of reference fingerprints that matches the query fingerprint; and (iv) while the media playback device is playing back the first content received on the first channel, providing, by the media playback device for display, at least a portion of the identifying information.

In another aspect, an example non-transitory computer-readable medium is disclosed. The computer-readable medium has stored thereon program instructions that upon execution by a processor, cause performance of a set of acts including (i) while a media playback device is playing back first content received on a first channel, generating a query fingerprint using second content received on a second channel; (ii) sending the query fingerprint to a server that maintains a reference database containing a plurality of reference fingerprints; (iii) receiving, from the server, identifying information corresponding to a reference fingerprint of the plurality of reference fingerprints that matches the query fingerprint; and (iv) while the media playback device is playing back the first content received on the first channel, providing at least a portion of the identifying information for display.

In another aspect, an example computing system is disclosed. The computing system is configured for performing a set of acts including (i) while a media playback device is playing back first content received on a first channel, generating a query fingerprint using second content received on a second channel; (ii) sending the query fingerprint to a server that maintains a reference database containing a plurality of reference fingerprints; (iii) receiving, from the server, identifying information corresponding to a reference fingerprint of the plurality of reference fingerprints that matches the query fingerprint; and (iv) while the media playback device is playing back the first content received on the first channel, providing at least a portion of the identifying information for display.

DETAILED DESCRIPTION

I. Overview

Currently, while a media playback device of a vehicle is playing back content received on a first channel, it is difficult to know what content is being provided on other channels that are different from the first channel without tuning away from the first channel. For instance, when listening to content being played back on a first channel by a radio, it is difficult to know what content is being provided on other channels that are different from the first channel without tuning away from the first channel. Similarly, when a user is not interested in content that a media playback device is playing back on a first channel, it is difficult for the user to find content on another channel that the user is interested in without successively tuning in to multiple channels. When searching for different content, the user might not know what content is being provided on another channel before the user tunes in to the channel.

Disclosed herein are methods and systems to address this and potentially other issues. In an example method, while a media playback device is playing back first content received on a first channel, the media playback device can generate a query fingerprint using second content received on a second channel. The media playback device can then send the query fingerprint to a server that maintains a reference database containing a plurality of reference fingerprints. Further, the media playback device can receive, from the server, identifying information corresponding to a reference fingerprint of the plurality of reference fingerprints that matches the query fingerprint. The media playback device can then provide at least a portion of the identifying information for display. In this manner, while the media playback device is playing back the first content received on the first channel, a display can provide an indication of the second content that is being provided on the second channel, so that a user of the media playback device can decide whether to tune away from the first channel and to the second channel.

While portions of this disclosure refer to media playback devices that are located in vehicles, the examples are not meant to be limiting. The systems and methods disclosed herein are also applicable to media playback devices that are not located in vehicles, such as portable media playback devices and media playback devices that are located in homes, offices, or other buildings.

In addition, while portions of this disclosure refer to media playback devices that provide audio content, the examples are not meant to be limiting. The systems and methods are also applicable to media playback devices that provide video content.

II. Example Architecture

A. Computing Device

Figure 1:
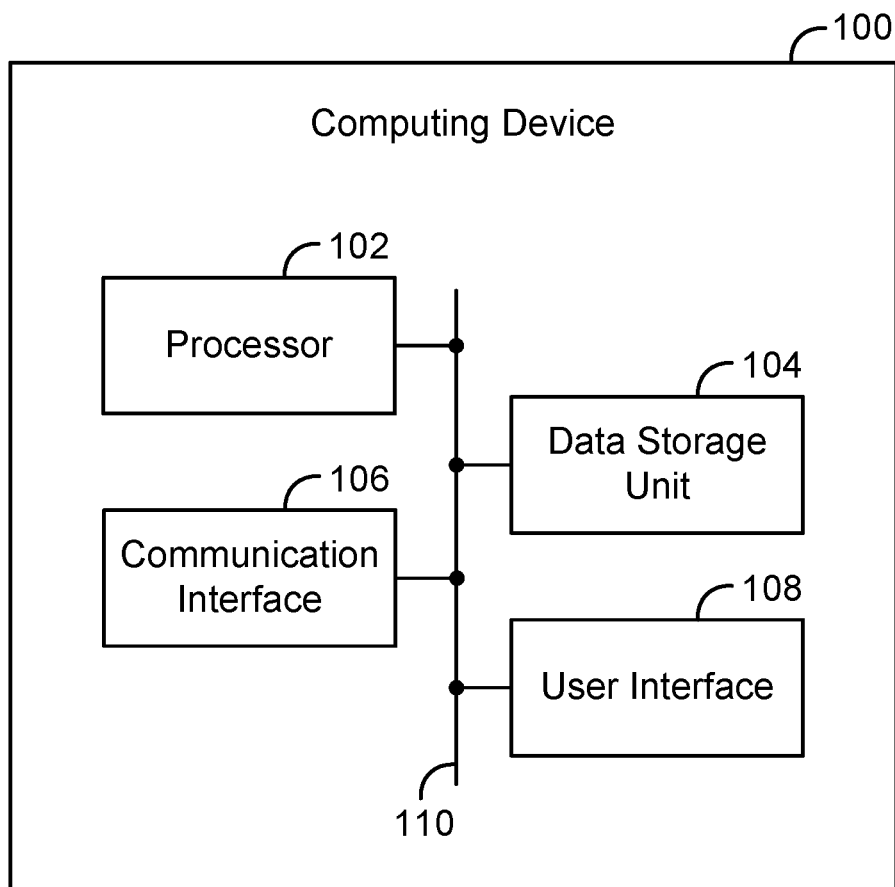
FIG. 1 is a simplified block diagram of an example computing device.

FIG. 1 is a simplified block diagram of an example computing device 100. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

B. Media Preview System

Figure 2:
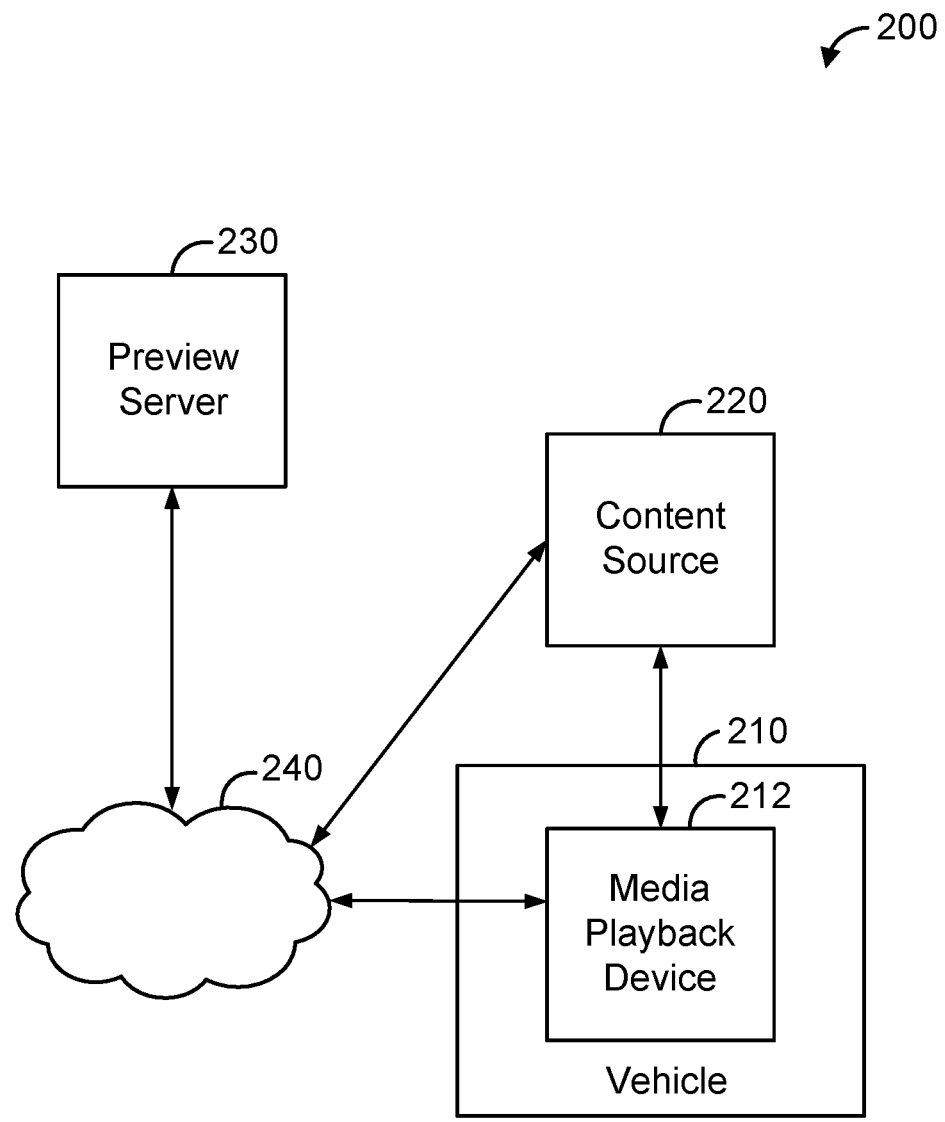
FIG. 2 is a simplified block diagram of an example media preview system.

FIG. 2 is a simplified block diagram of an example media preview system 200. Media preview system 200 can perform various acts and/or functions related to the delivery and/or presentation of identifying information for media content (e.g., audio content and/or video content), and can be implemented as a computing system.

Media preview system 200 can include various components, such as a vehicle 210, content source 220, and preview server 230. Vehicle 210 can, in turn, include a media playback device 212. Each of media playback device 212 and preview server 230 can be implemented as a computing system.

Vehicle 210 can be a machine that transports people, such as an automobile, motorcycle, watercraft, or aircraft, for instance. Media playback device 212 of vehicle 210 can include at least one computing device and can take various forms. By way of example, media playback device 212 can include a head unit of vehicle 210. The head unit can include a display and a user interface that provide a user of vehicle 210 with control over media content presented by vehicle 210. Although FIG. 2 depicts media playback device 212 as being located in vehicle 210, in other media preview systems, a media playback device might not be located in a vehicle. For instance, other examples of media playback devices include radios, televisions, smart speakers, and smart displays.

Media playback device 212 can receive audio content, video content, and/or text content from content source 220, and can receive this content either directly from content source 220 or indirectly by way of a network 240. Content source 220 can include a radio station, television station, or web server. For example, content source 220 may be a radio station or radio network that streams or transmits audio over a channel to media playback device 212, a television (TV) station or TV network that streams or transmits media over a channel to media playback device 212, and/or a web service that streams or transmits media over network 270 to media playback device 212.

Accordingly, media playback device 212 can include at least one tuner configured to receive an input stream of media content and generate an output stream of media content by processing the input stream. Media playback device 212 can be equipped with tuners, decoders, and other hardware and/or software such that media playback device 212 can access media content that is broadcast by content source 220. Additionally or alternatively, media playback device 212 can be equipped with network adapters, decoders, and other hardware and/or software such that media playback device 212 can access media content that is distributed through a wide area network (e.g., the internet).

Media playback device 212 can also include a display or other user interface configured to display identifying information corresponding to media content being provided on one or more respective channels. The display may be a flat-panel screen, a plasma screen, a light emitting diode (LED) screen, or a liquid crystal display (LCD), for instance.

In line with the discussion above, while media playback device 212 is playing back content received on a first channel, media playback device 212 can send a preview request to preview server 230. The preview request can include a query fingerprint that is generated by media playback device 212 using second content received on a second channel. By way of example, media playback device 212 can be playing back audio content received on a given radio station, and generate a query fingerprint using audio content that is received on a second radio station. Media playback device 212 can then send the query fingerprint to preview server 230 within a preview request. As another example, media playback device 212 can be playing back video content received on a first channel, generate a query fingerprint using video content received on a second channel, and send the query fingerprint to preview server 230 in a preview request.

Media playback device 212 can periodically transmit preview requests to preview server 230. For instance, media playback device 212 can send a preview request every five or ten seconds, or every minute. In some instances, a preview request can include query fingerprints corresponding to a batch of second channels. For instance, for each of multiple channels other than the first channel, the preview request can include a respective query fingerprint generated from content recently received on the channel.

Preview server 230 can maintain a reference database that includes a plurality of reference fingerprints. The reference database can associate each reference fingerprint of the plurality of reference fingerprints with identifying information for respective media content from which the reference fingerprint was generated.

The identifying information that is associated with a reference fingerprint can take various forms. For example, the identifying information can include a media unique identifier (e.g., a track unique identifier (TUI)). For audio content, the identifying information can include a track title, album title, and artist name. Additionally or alternatively, the identifying information can include an album image (e.g., cover art) or artist image. The identifying information can also include a program identifier that identifies an audio program. Similarly, for video content, the identifying information can include a title and a program identifier that identifies a video program. In some examples, the reference database can include the identifying information for respective reference fingerprints that the reference database maintains. Additionally or alternatively, the reference database can include identifiers for respective fingerprints that the reference database maintains. With this approach, an identifier from the reference database can be used to retrieve identifying information corresponding to a reference fingerprint.

After receiving the preview request, preview server 230 can query the reference database to correlate each of one or more query fingerprints to a reference fingerprint, determine identifying information corresponding to the reference fingerprint(s), and provide at least a portion of the identifying information to media playback device 212 in a response.

After receiving the response, media playback device 212 can provide at least a portion of the identifying information for display. Media playback device 212 can provide for display identifying information corresponding to content being provided on one or more second channels while the media playback device is playing back content that is received on a first channel.

Additionally or alternatively, media playback device 212 can provide at least a portion of the identifying information to another device for display. For instance, media playback device 212 can provide a portion of the identifying information to another component of vehicle 210 for display.

Network 240 may be any network that enables communication between devices, such as a wired network and/or a wireless network (e.g., a mobile network).

Figure 3:
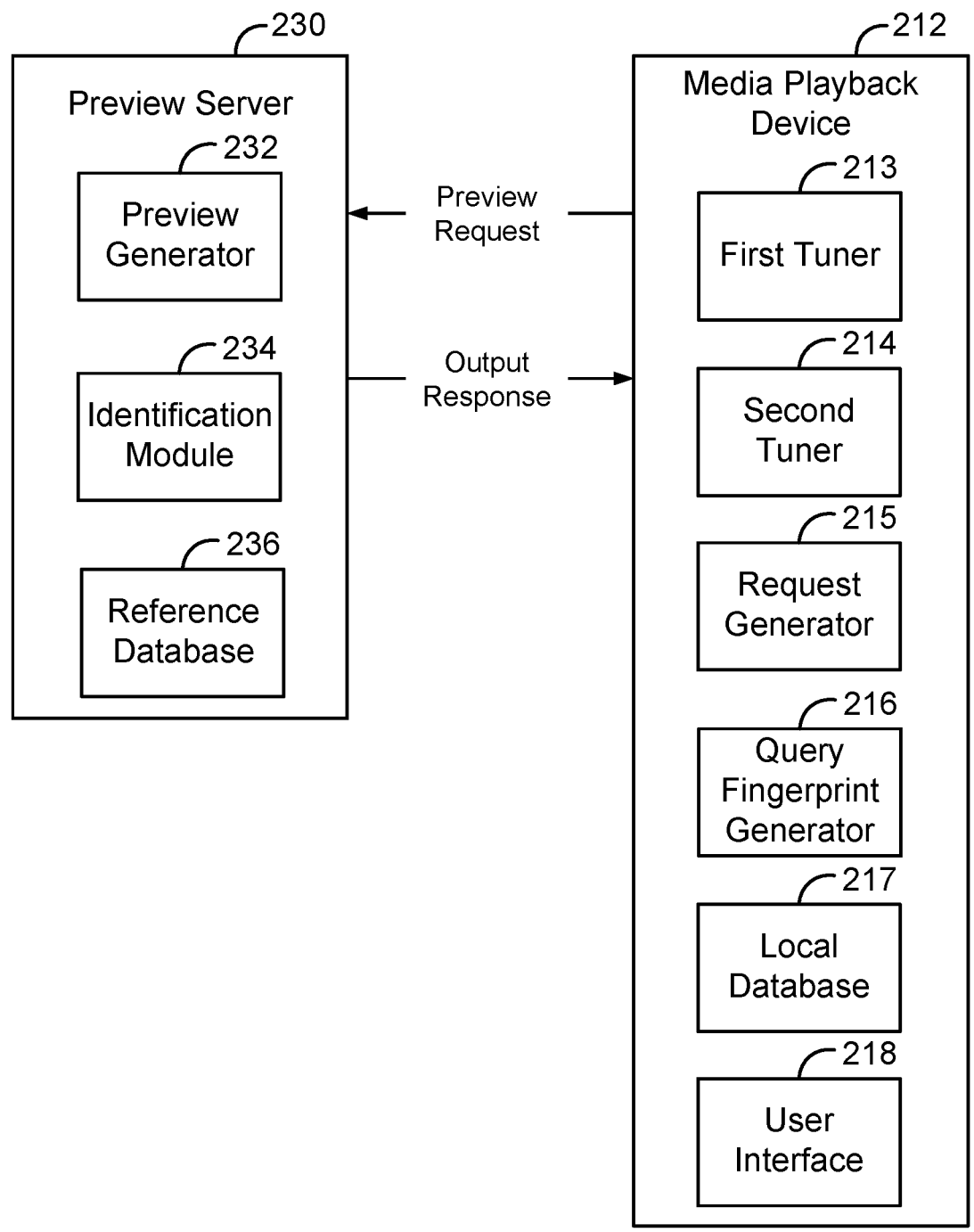
FIG. 3 is a simplified block diagram illustrating components of a preview server and a media playback device, according to an example embodiment.

FIG. 3 is a simplified block diagram illustrating components of media playback device 212 and preview server 230. As shown in FIG. 3, media playback device 212 includes a first tuner 213, second tuner 214, request generator 215, query fingerprint generator 216, local database 217, and user interface 218, all configured to communicate with each other (e.g., via a bus, shared memory, or switch). Further, preview server 230 includes a preview generator 232, identification module 234, and reference database 236, all configured to communicate with each other.

One or more of the components depicted in FIG. 3 can be implemented using hardware (e.g., a processor of a machine, a field-programmable gate array (FPGA), or an application-specific integrated circuit (ASIC), or a combination of hardware and software. Moreover, any two or more of the components depicted in FIG. 3 can be combined into a single component, and the function described herein for a single component can be subdivided among multiple components.

In line with the discussion above, media playback 212 device can receive first content on a first channel using first tuner 213. First tuner 213 can include a radio frequency (RF) receiver that is adjustable in order to receive a desired carrier frequency that the first channel uses to broadcast the first content. First tuner 213 can receive a transmission on the first channel, and convert the transmission into a fixed frequency that is suitable for further processing by a demodulator and an amplifier. Alternatively, first tuner 213 can receive a transmission on the first channel, and convert the transmission into audio and/or video signals that can be output by media playback device 212.

Similarly, second tuner can include an RF receiver that is adjustable in order to receive a desired carrier frequency that the second channel uses to broadcast the second content. After tuning to the second channel, media playback device 212 can obtain a sample of the second content.

While media playback device 212 is playing back content received on a first channel, request generator 215 of media playback device 212 can generate a preview request and provide the preview request to preview server 230. The preview request can include query fingerprints for one or more second channels that are different from the first channel.

Obtaining the query fingerprint(s) can involve tuning to one or more second channels using second tuner 214, and, for each of the one or more second channels, obtaining a sample of second content that is provided on the second channel. For instance, while media playback device 212 is playing back first content received on the first channel, request generator 215 can cause second tuner 214 to tune to a second channel that is different from the first channel, and receive and record a portion of the second content.

Request generator 215 can select the second channel(s) in various ways. As one example, request generator 215 can select the second channels based on a characteristic of the first channel. For instance, based on the first channel being associated with a first genre (e.g., blues, jazz, country, etc.), request generator 215 can select channels that are also associated with the first genre. As another example, request generator 215 can select the second channels based on channels that are programmed as presets of media playback device 212.

As still another example, request generator 215 can select as the second channels one or more other channels that are located within a frequency range or channel range of the first channel. For instance, request generator 215 can scan for available channels using second tuner 214, and then select the next two available channels that are above the first channel and the next two available channels that are below the first channel. If the first channel is assigned to a frequency of 98.1 megahertz (MHz), request generator 215 could select second channels assigned to frequencies of 96.9 MHz, 97.3 MHz, 98.9 MHz, and 99.5 MHz based on those channels being the available channels that are adjacent to the first channel in a particular geographic area. Or if the first channel is channel 124, request generator 215 could select channels 122, 123, 125, and 126.

For each second channel to be represented within the preview request, request generator 215 can obtain a sample of the second content, and provide the sample to query fingerprint generator 216 for generation of a query fingerprint. In some instances, the query fingerprint for a sample of media content can include multiple fingerprints derived from the sample, such as multiple fingerprints derived from a three-second sample of audio content.

In examples in which the received content is audio content, query fingerprint generator 216 can be configured to distinguish between music and speech using a classifier. The classifier can include software configured to receive an input audio signal, and classify the input audio signal as either speech or music based on characteristics of the sample of media content. The classifier may utilize any characteristics of an input audio signal to classify the input audio signal. For example, the classifier may use spectral characteristics of the input audio signal, constant Q transform (CQT) characteristics for the input audio signal, or any other parameters. In some examples, time samples, spectrogram(s), summaries, transformations, and/or descriptions of the audio signal are used as inputs to the classifier. Such characteristics may be input into a neural network model to determine a classification group for the input audio signal.

Upon determining that a sample of media content is speech rather than music, query fingerprint generator 216 can cause request generator 215 to obtain another sample of media content. Whereas, upon determining that a sample of media content is music rather than speech, query fingerprint generator 216 can generate a query fingerprint from the sample based on the determination that the sample is music rather than speech.

Upon receiving the preview request, preview generator 232 of preview server 230 can retrieve identifying information corresponding to the query fingerprint(s) included within the preview request, and provide the identifying information to media playback device 212 in an output response. To retrieve identifying information corresponding to a query fingerprint, identification module 234 can correlate the query fingerprint to a reference fingerprint of reference database 236.

For instance, identification module 234 can compare the query fingerprint to reference fingerprints of reference database 236, and determine that the query fingerprint matches at least one reference fingerprint. Determining that the query fingerprint matches at least one reference fingerprint can involve determining that a similarity between the query fingerprint and at least one of the reference fingerprints satisfies a predetermined threshold. The predetermined threshold can be associated with a Tanimoto distance measurement, a Manhattan distance measurement, or other distance measurements. Broadcast monitoring server 240a can also use other matching techniques, such as Euclidian, Cosine, KL-Divergence, and/or Itakura matching techniques, to match the query fingerprint to at least one known reference fingerprint.

After determining that a query fingerprint of the preview request corresponds to a reference fingerprint of reference database 236, identification module 234 can then determine identifying information corresponding to the reference fingerprint, and provide the identifying information to preview generator 232 for inclusion in the output response. In some instances, reference database 236 can store reference fingerprints and respective identifying information for the reference fingerprints in reference database 236. Additionally or alternatively, reference database 236 can store reference fingerprints and respective identifiers that can be used to access identifying information corresponding to the reference fingerprints. For instance, for one or more reference fingerprints, reference database 236 may associate the reference fingerprint with a unique identifier. The unique identifier can be used to retrieve identifying information that is associated with the reference fingerprint from a separate database.

The reference fingerprints and associated identifying information of reference database 236 can be updated periodically (e.g., once per day, every week, etc.). For instance, preview server 230 may periodically receive new reference fingerprints and associated identifying information, and add the reference fingerprints and associated identifying information to reference database 236. Similarly, preview server 230 may periodically receive new reference fingerprints and associated unique identifiers, and add the reference fingerprints and associated identifying information to reference database 236.

After obtaining the identifying information, preview generator 232 can generate an output response that includes identifying information for the channels from which the query fingerprint(s) were derived, and provide the output response to media playback device 212. The output response can be in the form of text data, such as a listing of channels and corresponding identifying information. The identifying information can include one or more links to image data, such as a link to album art or a link to an image of a song artist or an image of a program host.

In some examples, preview generator 232 might not be able to retrieve identifying information for a query fingerprint included in the preview request. Upon determining that identifying information for a query fingerprint is unavailable, the preview generator 232 can add the query fingerprint to a list or increment a count associated with the query fingerprint. This data regarding how often identifying information for a query fingerprint is requested but unavailable can be stored by preview server 230 and, upon request, can be provided to another system.

Upon receiving the output response, media playback device 212 can store the identifying information for the channels in local database 217 of media playback device 212. Media playback device 212 can display a portion of the identifying information using user interface 218. For example, media playback device 212 can display respective identifying information for multiple channels in respective user interface elements (e.g., respective tiles) corresponding to each channel of the multiple channels. The identifying information can be displayed in a now-playing guide that is accessible via user interface 218. In some instances, the identifying information can be displayed adjacent to identifying information for the first channel. Alternatively, when the identifying information is displayed, identifying information for the first channel might not be visible within user interface 218.

In some instances, upon receiving a preview request, preview generator 232 can also select an advertisement, and send the advertisement to media playback device 212 within the output response. Media playback device 212 can then provide the advertisement for display when displaying identifying information that is included within the output response. An owner of an item of media content or a third party may pay a fee to associate an advertisement with the item. With this arrangement, preview generator 232 can determine that an item of media content that is playing on a channel has an associated advertisement and that identifying information for the item of media content will be provided to media playback device 212 in an output response. Based on making this determination, preview generator 232 can include the advertisement in the output response, for display in conjunction with the identifying information.

Figure 4:
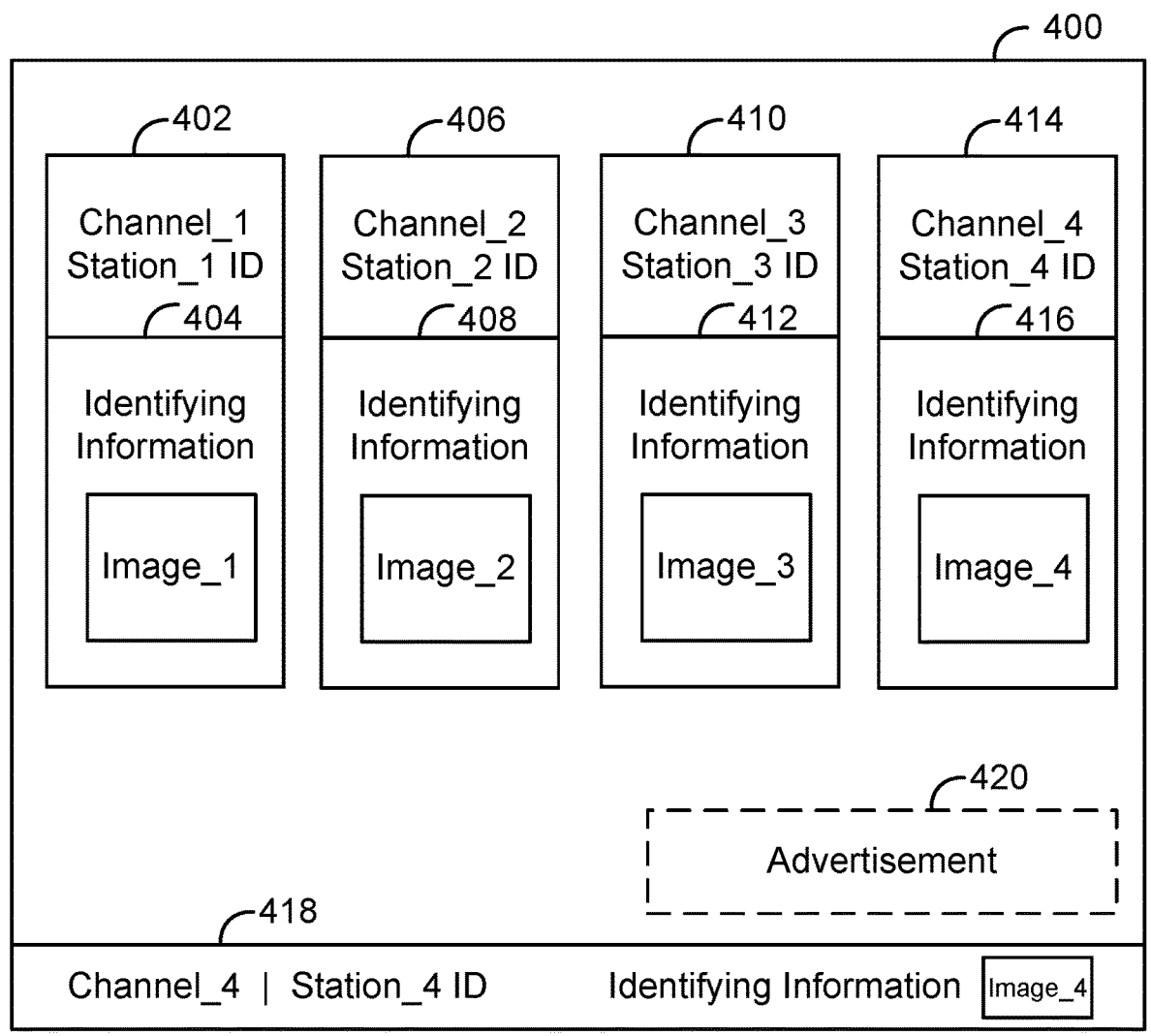
FIG. 4 illustrates an example display provided by a media playback device.

FIG. 4 illustrates an example display 400 that a media playback device, such as media playback device 212, can provide. As shown in FIG. 4, display 400 includes four identification elements 402, 406, 410, and 414 corresponding to four respective identifying-information tiles 404, 408, 412, 416. Each of the identification elements 402, 406, 410, and 414 displays data indicative of a respective channel. The data indicative of a respective channel can, for example, include a frequency, channel name, channel identifier (e.g., call sign), genre, and/or channel logo.

Further, each of the identifying-information tiles 404, 408, 412, and 416 displays identifying information for content being provided on a corresponding channel. In particular, identifying-information tile 404 displays identifying information for content being provided on a first channel identified by identification element 402, identifying-information tile 408 displays identifying information for content being provided on a second channel identified by identification element 406, identifying-information tile 412 displays identifying information for content being provided on a third channel identified by identification element 410, and identifying-information tile 416 displays identifying information for content being provided on a fourth channel identified by identification element 414. Hence, display 400 may allow a user of the media playback device to visually browse what's playing across multiple channels, thereby simplifying media content search and discovery.

For the display 400, the fourth channel is the currently selected channel. In other words, the media playback device displays identification elements 402, 406, 410, and 414 and identifying-information tiles 404, 408, 412, and 416 while the media playback device is playing back content that is received on the fourth channel. To notify a user that media playback device is playing back content that is received on the fourth channel, data indicative of the fourth channel and identifying information for the content being provided on the fourth channel is displayed in a current-channel element 418.

Further, each identification element 402, 406, 410, and 414 and/or each identifying-information tile 404, 408, 412, and 416 may be selectable by a user of the media playback device. For instance, a user can select identification element 402 or identifying-information tile 404 to cause the media playback device to switch from tuning to the fourth channel tune to tuning to the first channel.

In other examples, the media playback device might be playing back content that is received on a fifth channel that is different from each of the first channel, second channel, third channel, and fourth channel. With this approach, data indicative of the fifth channel and identifying information for the content being provided on the fifth channel can be displayed in the current-channel element 418 (not shown).

As further shown in FIG. 4, display 400 can optionally include an advertisement 420. The advertisement may include text and/or an image, for instance. The advertisement may have been provided to the media playback device along with the identifying information that is being displayed in the identifying-information tiles 404, 408, 412, and 416.

III. Example Operations

Figure 5:
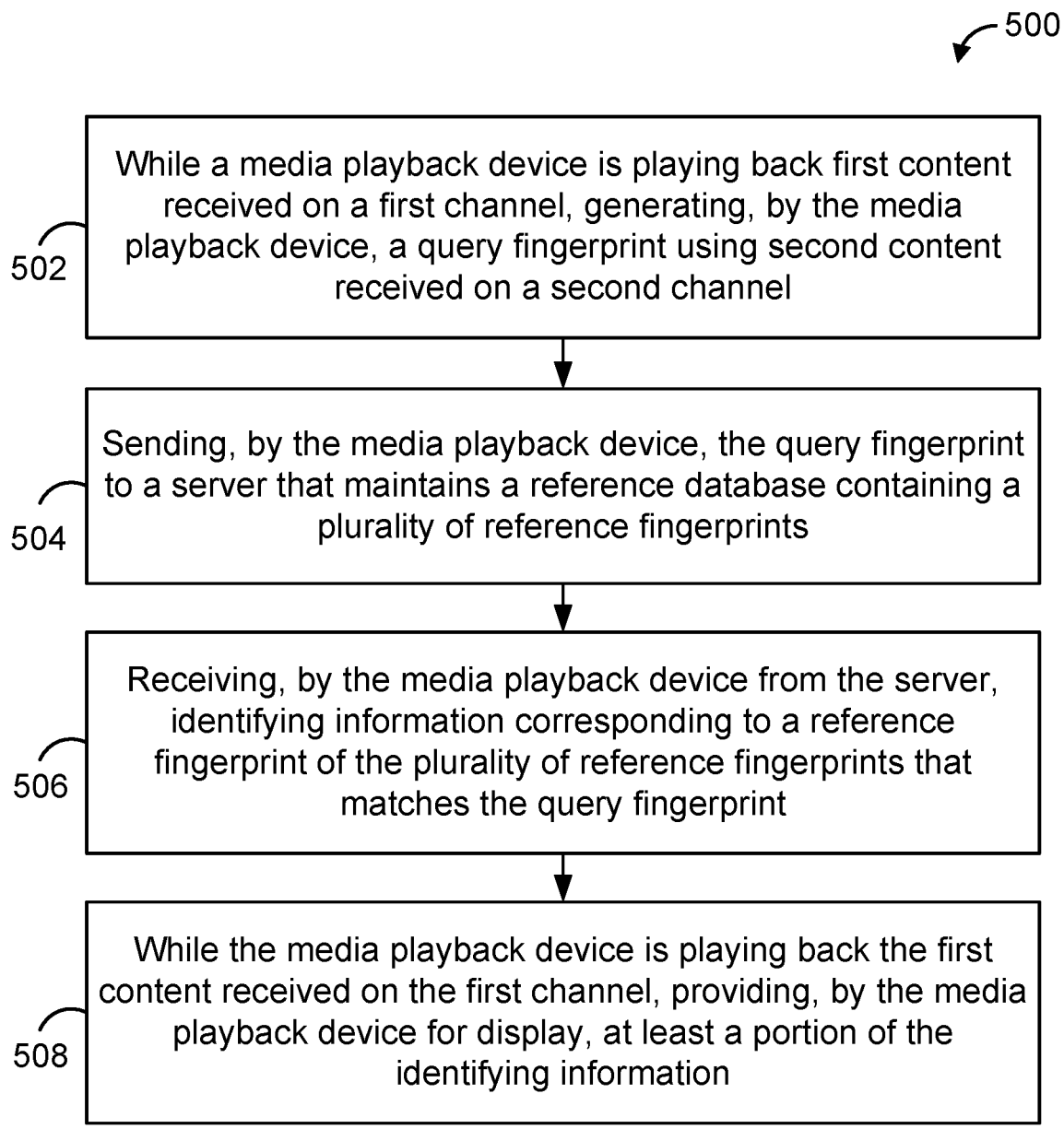
FIG. 5 is a flow chart of an example method.

FIG. 5 is a flow chart of an example method 500. Method 500 can be carried out by a media playback device, such as media playback device 212 or more generally, by a computing system. At block 502, method 500 includes while a media playback device is playing back first content received on a first channel, generating, by the media playback device, a query fingerprint using second content received on a second channel. At block 504, method 500 includes sending, by the media playback device, the query fingerprint to a server that maintains a reference database containing a plurality of reference fingerprints. At block 506, method 500 includes receiving, by the media playback device from the server, identifying information corresponding to a reference fingerprint of the plurality of reference fingerprints that matches the query fingerprint. And at block 508, method 500 includes while the media playback device is playing back the first content received on the first channel, providing, by the media playback device for display, at least a portion of the identifying information.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
while a media playback device is playing back first content received on a first channel broadcast by a first radio station, determining, by the media playback device using a classifier, that second content received on a second channel comprises audio content, wherein the second content is broadcast by a second radio station;
generating, by the media playback device, using the audio content, a query fingerprint based on the determining that the second content comprises the audio content;
sending, by the media playback device, a preview request comprising the query fingerprint to a server that maintains a reference database containing a plurality of reference fingerprints;
in response to sending the preview request, receiving, by the media playback device from the server, identifying information corresponding to a reference fingerprint of the plurality of reference fingerprints that matches the query fingerprint; and
while the media playback device is playing back the first content received on the first channel, providing, by the media playback device for display, at least a portion of the identifying information.

2. The method of claim 1, wherein the first content received on the first channel is audio content.

3. The method of claim 1:
wherein the first content is received using a first tuner of the media playback device, and
wherein the method further comprises receiving the second content using a second tuner of the media playback device.

4. The method of claim 3, further comprising selecting, by the media playback device, the second channel from among a plurality of channels.

5. The method of claim 4, further comprising scanning for available channels using the second tuner so as to determine the plurality of channels.

6. The method of claim 4, wherein the plurality of channels are channels that are programmed as presets of the media playback device.

7. The method of claim 4:
wherein the first channel is associated with a first genre, and
wherein the second channel is selected based on the second channel being associated with the first genre.

8. The method of claim 1, further comprising:
determining, using the classifier, that the second content received on the second channel comprises music rather than speech;
receiving an input audio signal corresponding to the second content; and
classifying the input audio signal as either speech or music based on characteristics of the second content.

9. The method of claim 8, wherein classifying the input audio signal as either speech or music based on characteristics of the second content comprises the classifier using one or more spectral characteristics of the second content.

10. The method of claim 9, wherein the one or more spectral characteristics of the second content comprises constant Q transform (CQT) characteristics for the second content.

11. The method of claim 1, wherein the identifying information comprises a media unique identifier.

12. The method of claim 1, wherein the identifying information comprises a track title, album title, and artist name.

13. The method of claim 1, wherein the identifying information comprises a program identifier.

14. The method of claim 1, wherein providing the at least a portion of the identifying information for display comprises providing the at least a portion of the identifying information for display on a user interface of the media playback device.

15. The method of claim 1, wherein providing the at least a portion of the identifying information for display comprises providing the at least a portion of the identifying information for display in association with an identifier of the second channel.

16. The method of claim 1, wherein the media playback device is a media playback device of a vehicle.

17. The method of claim 1, further comprising:
receiving, by the media playback device from the server, an advertisement corresponding to the reference fingerprint; and
providing, by the media playback device for display, the advertisement.

18. A non-transitory computer-readable medium having stored thereon program instructions that upon execution by a processor, cause performance of a set of acts comprising:
while a media playback device is playing back first content received on a first channel broadcast by a first radio station, determining, using a classifier, that second content received on a second channel comprises audio content, wherein the second content is broadcast by a second radio station;
generating, using the audio content, a query fingerprint based on the determining that the second content comprises the audio content;
sending a preview request comprising the query fingerprint to a server that maintains a reference database containing a plurality of reference fingerprints;
in response to sending the preview request, receiving, from the server, identifying information corresponding to a reference fingerprint of the plurality of reference fingerprints that matches the query fingerprint; and
while the media playback device is playing back the first content received on the first channel, providing at least a portion of the identifying information for display.

19. The non-transitory computer-readable medium of claim 18, wherein the set of acts further comprises:
determining, using the classifier, that the second content received on the second channel comprises music rather than speech;
receiving an input audio signal corresponding to the second content; and
classifying the input audio signal as either speech or music based on characteristics of the second content.

20. A computing system comprising:
a processor; and a non-transitory computer-readable medium having stored thereon program instructions that upon execution by the processor, cause performance of a set of acts comprising:
  while a media playback device is playing back first content received on a first channel broadcast by a first radio station, determining, using a classifier, that second content received on a second channel comprises audio content, wherein the second content is broadcast by a second radio station;
  generating, using the audio content, a query fingerprint based on the determining that the second content comprises the audio content;
  sending a preview request comprising the query fingerprint to a server that maintains a reference database containing a plurality of reference fingerprints;
  in response to sending the preview request, receiving, from the server, identifying information corresponding to a reference fingerprint of the plurality of reference fingerprints that matches the query fingerprint; and
  while the media playback device is playing back the first content received on the first channel, providing at least a portion of the identifying information for display.

* * * * *